(12) United States Patent
Nagai et al.

(10) Patent No.: US 11,791,993 B2
(45) Date of Patent: Oct. 17, 2023

(54) SHARED KEY SYSTEM, INFORMATION PROCESSING APPARATUS, EQUIPMENT, SHARED KEY METHOD AND PROGRAM

(71) Applicant: NIPPON TELEGRAPH AND TELEPHONE CORPORATION, Tokyo (JP)

(72) Inventors: Akira Nagai, Tokyo (JP); Kotaro Suzuki, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 313 days.

(21) Appl. No.: 17/058,116

(22) PCT Filed: Apr. 25, 2019

(86) PCT No.: PCT/JP2019/017804
§ 371 (c)(1),
(2) Date: Nov. 23, 2020

(87) PCT Pub. No.: WO2019/230291
PCT Pub. Date: Dec. 5, 2019

(65) Prior Publication Data
US 2021/0211275 A1 Jul. 8, 2021

(30) Foreign Application Priority Data

May 29, 2018 (JP) .................................. 2018-102726

(51) Int. Cl.
*H04L 9/40* (2022.01)
*H04L 9/08* (2006.01)
*H04L 9/30* (2006.01)

(52) U.S. Cl.
CPC ............ *H04L 9/085* (2013.01); *H04L 9/0825* (2013.01); *H04L 9/0827* (2013.01); *H04L 9/3066* (2013.01)

(58) Field of Classification Search
CPC ..... H04L 9/085; H04L 9/0825; H04L 9/0827; H04L 9/3066
See application file for complete search history.

(56) References Cited

U.S. PATENT DOCUMENTS

| 7,181,014 | B1* | 2/2007 | Srivastava | ............ H04L 9/0833 713/168 |
| 2009/0249063 | A1* | 10/2009 | Sakurai | ................... H04L 63/08 713/155 |
| 2016/0352516 | A1* | 12/2016 | Oberheide | ............ H04L 9/0897 |

OTHER PUBLICATIONS

NTT Secure Platform Laboratories (2015) "Specification of FSU version 1.0," 4 pages.

(Continued)

*Primary Examiner* — Thaddeus J Plecha

(57) ABSTRACT

A key sharing system that generates a shared key that is used to perform encrypted communication between a first device and a second device according to an authenticated key sharing protocol, at least one device of the first device and the second device including: calculation means for calculating a shared value $\sigma_j$ of shared values $\sigma_i$ (i=1, ..., n) that are used to generate the shared key, the shared value $\sigma_j$ being calculated through pairing computation, using a private key $D_{A,1}$ as an input; entrusting means for entrusting an information processing apparatus that is connected to the device via a network, with calculation of a shared value $\sigma_k$ (k≠j) of the shared values $\sigma_i$ (i=1, ..., n), the shared value $\sigma_k$ being calculated through pairing computation, using a private key $D_{A,2}$ as an input; and key generation means for generating the shared key, using the shared value $\sigma_j$ calculated by the (Continued)

calculation means and the shared value $\sigma_k$ calculated by the information processing apparatus.

20 Claims, 6 Drawing Sheets

(56) References Cited

OTHER PUBLICATIONS

Nakashima et al. (2012) "Proposal of partial calculation consignment method for authentication and key sharing calculation of wireless multi-hop network node," Proceedings of the 2012 Symposium on Cryptography and Information Security, 3E2-2, pp. 1-6.
Fujioka et al. (2011) "Sufficient Condition for Identity-Based Authenticated Key Exchange Resilient to Leakage of Secret Keys," LNCS, ICISC 2011, vol. 7259, pp. 490-509.

* cited by examiner

SHARED KEY SYSTEM, INFORMATION PROCESSING APPARATUS, EQUIPMENT, SHARED KEY METHOD AND PROGRAM

CROSS-REFERENCE TO RELATED APPLICATIONS

This application is a U.S. 371 Application of International Patent Application No. PCT/JP2019/017804, filed on 25 Apr. 2019, which application claims priority to and the benefit of JP Application No. 2018-102726, filed on 29 May 2018, the disclosures of which are hereby incorporated herein by reference in their entireties.

TECHNICAL FIELD

The present invention relates to a key sharing system, an information processing apparatus, a key device, a key sharing method, and a program.

BACKGROUND ART

In recent years, authentication for mutual validation is more and more important in cases where IoT (Internet of Things) devices communicate with each other, or IoT devices communicate with gateway devices, server devices, or the like on a cloud. For example, a password, an electronic certificate that employs a PKI (Public Key Infrastructure), and so on are common as authentication methods for IoT devices. In addition, authenticated key sharing protocols that employ ID-based cryptography are also known. Here, ID-based cryptography is a public-key cryptography that can use an identifier such as an ID that is expressed as a given character string as a public key. When ID-based cryptography is used for an IoT device, the manufacturing code, the serial number, or the like of the IoT device can be used as the public key, for example. Note that key sharing protocols are also referred to as key exchange protocols.

Generally, according to an authenticated key sharing protocol, devices (e.g. IoT devices, server apparatuses, or the like) that are desired to perform key sharing for encrypted communication perform mutual authentication, and a shared key is generated if the authentication is successful. For example, M-Pin Full, which is an authenticated key sharing protocol that employs a Pin (Personal identification number), FSU (Fujioka-Suzuki-Ustaoglu), which is a pairing-based authenticated key sharing protocol, Chen-Cheng-Smart, and so on are known as authenticated key sharing protocols that employ ID-based cryptography.

According to authenticated key sharing protocols that employ ID-based cryptography, a master private key is held by a key generation center (KGC), private keys for the devices are issued based on this master private key, and thus authentication is performed. If the private keys issued for the devices leak out to a third party, the third party can perform spoofing. Therefore, each device must strictly manage the private key thereof.

CITATION LIST

Non Patent Literature

[NPL 1] NTT Secure Platform Laboratories, NTT Corporation: Specification of FSU version 1.0, <URL: https://info.isl.ntt.co.jp/crypt/eng/archive/dl/fsu/FSU.pdf>

SUMMARY OF THE INVENTION

Technical Problem

There are two methods for safely managing a private key. The first method is to save the private key in a tamper-resistant and secure storage area so that the private key is less likely to leak out. The second method is to use a plurality of private keys so that spoofing cannot be performed even if one of the private keys leaks out.

However, processing capabilities regarding calculation in a tamper-resistant secure area (e.g. a SIM (Subscriber Identity Module) or the like) is lower than in a PC (Personal Computer) or the like. Therefore, when the above first method is used, it may be difficult to realize key sharing within a feasible processing time.

Here, when the above second method is used, a device other than the devices (e.g. IoT devices, servers, or the like) that are desired to perform key sharing for encrypted communication is prepared, and the private key is saved in the other device. Therefore, when the above first method is used, it is possible to realize key sharing within a feasible processing time by entrusting the other device with processing for the private key, even if the devices that are desired to perform key sharing for encrypted communication are IoT device or the like.

An embodiment of the present invention is made in view of the foregoing, and an object thereof is to realize highly secure authenticated key sharing while preventing degradation in terms of processing time, regardless of the processing capabilities of the devices.

Means for Solving the Problem

To achieve the above-described object, an embodiment of the present invention provides a key sharing system that generates a shared key that is used to perform encrypted communication between a first device and a second device according to an authenticated key sharing protocol, at least one device of the first device and the second device including: calculation means for calculating a shared value $\sigma_j$ of shared values $\sigma_i$ ($i=1, \ldots, n$) that are used to generate the shared key, the shared value $\sigma_j$ being calculated through pairing computation, using a private key $D_{A,1}$ as an input; entrusting means for entrusting an information processing apparatus that is connected to the device via a network, with calculation of a shared value $\sigma_k$ ($k \neq j$) of the shared values $\sigma_i$ ($i=1, \ldots, n$), the shared value $\sigma_k$ being calculated through pairing computation, using a private key $D_{A,2}$ as an input; and key generation means for generating the shared key, using the shared value $\sigma_j$ calculated by the calculation means and the shared value $\sigma_k$ calculated by the information processing apparatus.

Effects of the Invention

It is possible to realize highly secure authenticated key sharing while preventing degradation in terms of processing time, regardless of the processing capabilities of devices.

DESCRIPTION OF EMBODIMENTS

The following describes an embodiment of the present invention. The embodiment of the present invention describes a key sharing system 1 that can realize highly secure authenticated key sharing while preventing degradation in terms of processing time, even when IoT devices or the like that have relatively low processing capabilities are used.

<Overall Configuration>

Figure 1:
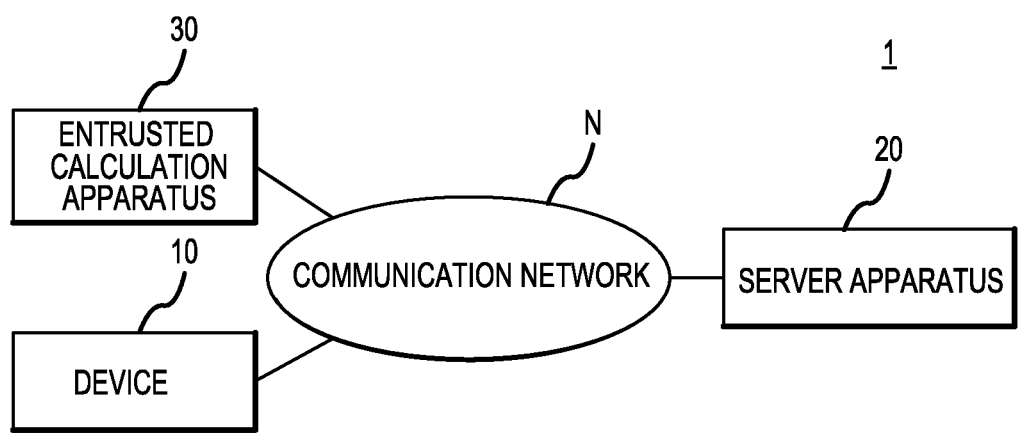
FIG. 1 is a diagram showing an example of an overall configuration of a key sharing system according to an embodiment of the present invention.

First, the following describes the overall configuration of the key sharing system 1 according to the embodiment of the present invention with reference to FIG. 1. FIG. 1 is a diagram showing an example of the overall configuration of the key sharing system 1 according to the embodiment of the present invention.

As shown in FIG. 1, the key sharing system 1 according to the embodiment of the present invention includes at least one device 10, a server apparatus 20, and an entrusted calculation apparatus 30. Also, the device 10, the server apparatus 20, and the entrusted calculation apparatus 30 are communicably connected to each other via a communication network N such as the Internet.

The device 10 is, for example, an IoT device such as any of various sensors. The device 10 shares a key (shared key) for encrypted communication, with another device 10 or the server apparatus 20, by performing authenticated key sharing that employs ID-based cryptography (hereinafter simply referred to as "authenticated key sharing"). At this time, the device 10 performs authenticated key sharing using a plurality of private keys, while entrusting the entrusted calculation apparatus 30 with processing for one or more private keys of the plurality of private keys.

Using the shared key shared with the other device 10 or the server apparatus 20, the device 10 performs encrypted communication with the other device 10 or the server apparatus 20.

Note that IoT devices may be various communicable devices other than various sensors, such as various digital home appliances, lighting devices, surveillance camera apparatuses, medical devices, and industrial devices. In the following description, an IoT device that has lower processing capabilities than typical PCs (personal computers) or the like is described as the device 10 according to the embodiment of the present invention. However, the device 10 may be a device other than an IoT device. For example, the device 10 may be a wearable device, a smartphone, a tablet terminal, or the like.

The server apparatus 20 is an information processing apparatus (a computer) that collects pieces of data (e.g. sensing data or the like) from the device 10. When collecting pieces of data from the device 10, the server apparatus 20 shares a shared key for encrypted communication with the device 10 by performing authenticated key sharing. The server apparatus 20 performs encrypted communication with the device 10, using the shared key shared with the device 10.

The entrusted calculation apparatus 30 is, for example, an edge computer or a fog computer installed physically close to the device 10. The entrusted calculation apparatus 30 performs processing for one or more private keys of the plurality of private keys to be used in authenticated key sharing when the device 10 performs authenticated key sharing with another device 10 or the server apparatus 20.

Note that the configuration of the key sharing system 1 shown in FIG. 1 is an example, and another configuration may be employed. For example, the device 10 and the entrusted calculation apparatus 30 may be communicably connected to each other via a local network such as an in-house network. Also, when authenticated key sharing and encrypted communication are performed between devices 10, the key sharing system 1 does not necessarily include the server apparatus 20.

<Hardware Configuration>

Next, the hardware configurations of the device 10, the server apparatus 20, and the entrusted calculation apparatus 30 according to the embodiment of the present invention will be described.

<<Device 10>>

Figure 2:
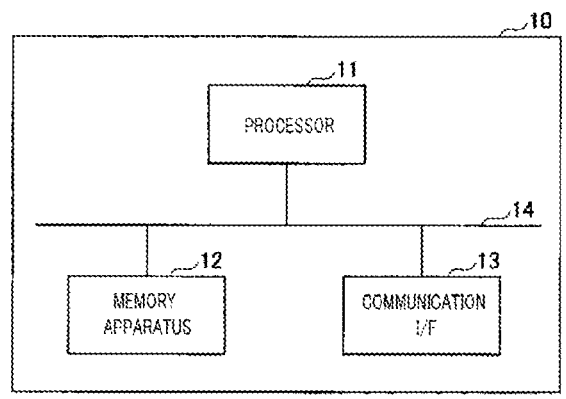
FIG. 2 is a diagram showing an example of a hardware configuration of a device according to the embodiment of the present invention.

The following describes the hardware configuration of the device 10 according to the embodiment of the present invention with reference to FIG. 2. FIG. 2 is a diagram showing an example of the hardware configuration of the device 10 according to the embodiment of the present invention.

As shown in FIG. 2, the device 10 according to the embodiment of the present invention includes a processor 11, a memory device 12, and a communication I/F 13. These pieces of hardware are communicably connected to each other via a bus 14.

The processor 11 is, for example, an MPU (Micro Processing Unit), a CPU (Central Processing Unit), or the like, and is a computation device that reads out programs and data from the memory device 12 and executes processing.

The memory device 12 is, for example, a RAM (Random Access Memory) a ROM (Read Only Memory), a flash memory, or the like, and stores various kinds of data, programs, and so on. The memory device 12 may include a tamper-resistant SIM, flash memory, or the like. Note that the memory device 12 stores one or more programs that realize the functions of the device 10 according to the embodiment of the present invention.

The communication I/F 13 is an interface for connecting the device 10 to the communication network N. The device 10 can perform data communication with another device 10, the server apparatus 20, the entrusted calculation apparatus 30, and so on via the communication I/F 13.

The device 10 according to the embodiment of the present invention has the hardware configuration shown in FIG. 2, and thus can realize various kinds of processing described below.

<<Server Apparatus 20 and Entrusted Calculation Apparatus 30>>

Figure 3:
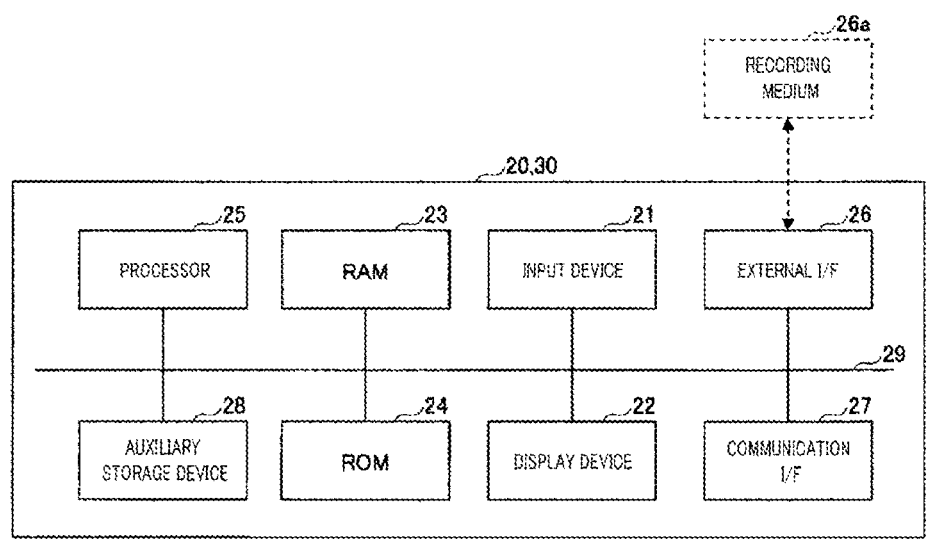
FIG. 3 is a diagram showing an example of a hardware configuration of a server apparatus and an entrusted calculation apparatus according to the embodiment of the present invention.

The following describes the hardware configuration of the server apparatus 20 and the entrusted calculation apparatus 30 according to the embodiment of the present invention with reference to FIG. 3. FIG. 3 is a diagram showing an example of the hardware configuration of the server apparatus 20 and the entrusted calculation apparatus 30 according to the embodiment of the present invention. The server apparatus 20 and the entrusted calculation apparatus 30 can be realized using the substantially same hardware configuration, and therefore the following mainly describes the hardware configuration of the server apparatus 20.

As shown in FIG. 3, the server apparatus 20 according to the embodiment of the present invention includes an input device 21, a display device 22, a RAM 23, a ROM 24, a processor 25, an external I/F 26, a communication I/F 27, and an auxiliary storage device 28. These pieces of hardware are communicably connected to each other via a bus 29.

The input device 21 is, for example, a keyboard, a mouse, a touch panel, or the like, and is used by the user to input various operations. The display device 22 is, for example, a display or the like, and is used to display the results of processing or the like to the user. It is possible that the server apparatus 20 and the entrusted calculation apparatus 30 do not include at least one of the input device 21 and the display device 22.

The RAM 23 is a volatile semiconductor memory that temporarily holds a program and data. The ROM 24 is a non-volatile semiconductor memory that can hold a program and data even when powered off. The processor 25 is, for example, a CPU or the like, and is a computation device that reads out a program and data from the ROM 24, the auxiliary storage device 28, or the like to the RAM 23 and executes processing.

The external I/F 26 is an interface with an external apparatus. The external apparatus is a recording medium 26*a* or the like. The recording medium 26*a* is, for example, a CD (Compact Disc), a DVD (Digital Versatile Disk), an SD memory card (Secure Digital memory card), a USB (Universal Serial Bus) memory card, or the like. For example, one or more programs that realize the functions of the server apparatus 20 and one or more programs that realize the functions of the entrusted calculation apparatus 30 may be recorded on the recording medium 26*a*.

The communication I/F 27 is an interface for connecting the server apparatus 20 to the communication network N. The server apparatus 20 can perform data communication with the device 10 via the communication I/F 27.

The auxiliary storage device 28 is, for example, a non-volatile storage device such as an HDD (Hard Disk Drive or an SSD (Solid State Drive). For example, one or more programs that realize the functions of the server apparatus 20 and one or more programs that realize the functions of the entrusted calculation apparatus 30 are stored in the auxiliary storage device 28.

The server apparatus 20 and the entrusted calculation apparatus 30 according to the embodiment of the present invention have the hardware configuration shown in FIG. 3, and thus can realize various kinds of processing described below. Although FIG. 3 shows a case in which the server apparatus 20 and the entrusted calculation apparatus 30 according to the embodiment of the present invention are each realized using one information processing apparatus (a computer), the present invention is not limited to such a configuration. The server apparatus 20 and the entrusted calculation apparatus 30 according to the embodiment of the present invention may be each be realized using a plurality of information processing apparatuses (computers).

<Functional Configuration>

Figure 4:
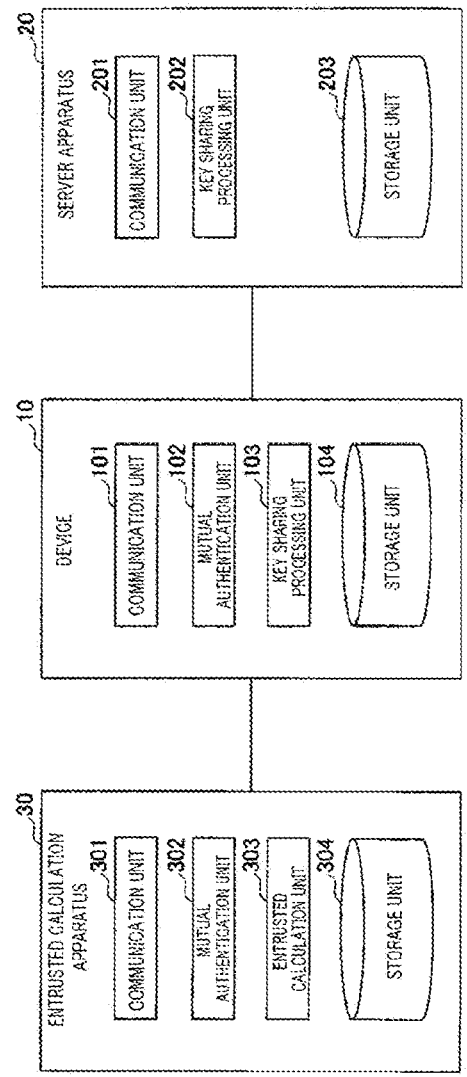
FIG. 4 is a diagram showing an example of a functional configuration of the key sharing system according to the embodiment of the present invention.

Next, the functional configuration of the key sharing system 1 according to the embodiment of the present invention will be described with reference to FIG. 4. FIG. 4 is a diagram showing an example of a functional configuration of the key sharing system 1 according to the embodiment of the present invention.

<<Device 10>>

As shown in FIG. 4, the device 10 according to the embodiment of the present invention includes a communication unit 101, a mutual authentication unit 102, and a key sharing processing unit 103. These functional units are realized through processing that one or more programs installed in the device 10 cause the processor 11 to execute.

The device 10 according to the embodiment of the present invention also includes a storage unit 104. The storage unit 104 can be realized using the memory device 12, for example.

The communication unit 101 performs various kinds of communication with another device 10, the server apparatus 20, or the entrusted calculation apparatus 30.

The mutual authentication unit 102 performs mutual authentication with the entrusted calculation apparatus 30, using a common key stored in the storage unit 104 in advance, before entrusting the entrusted calculation apparatus 30 with processing for one or more private keys of the plurality of private keys to be used in authenticated key sharing.

The key sharing processing unit 103 performs processing related to authenticated key sharing (hereinafter also referred to as "key sharing processing") with another device 10 or the server apparatus 20.

The storage unit 104 stores the private keys to be used in key sharing processing, the shared key to be used in mutual authentication with the entrusted calculation apparatus 30, and so on. Note that the storage unit 104 includes a tamper-resistant storage area (hereinafter also referred to as a "tamper-resistant area"), and at least the private keys and the shared key may be stored in the tamper-resistant area. In the following description, the private keys to be used in key sharing processing and the shared key to be used in mutual authentication with the entrusted calculation apparatus 30 are stored in the tamper-resistant area of the storage unit 104.

<<Server Apparatus 20>>

As shown in FIG. 4, the server apparatus 20 according to the embodiment of the present invention includes a communication unit 201 and a key sharing processing unit 202. These functional units are realized through processing that one or more programs installed in the server apparatus 20 cause the processor 25 of the server apparatus 20 to execute.

The server apparatus 20 according to the embodiment of the present invention also includes a storage unit 203. The storage unit 203 can be realized using the auxiliary storage device 28, the RAM 23, or the like of the server apparatus 20, for example.

The communication unit 201 performs various kinds of communication with the device 10. The key sharing processing unit 202 performs key sharing processing with the device 10. The storage unit 203 stores the private keys to be used in key sharing processing, and so on.

<<Entrusted Calculation Apparatus 30>>

As shown in FIG. 4, the entrusted calculation apparatus 30 according to the embodiment of the present invention includes a communication unit 301, a mutual authentication unit 302, and an entrusted calculation unit 303. These functional units are realized through processing that one or more programs installed in the entrusted calculation apparatus 30 cause the processor 25 of the entrusted calculation apparatus 30 to execute.

The entrusted calculation apparatus 30 according to the embodiment of the present invention also includes a storage unit 304. The storage unit 304 can be realized using the auxiliary storage device 28, the RAM 23, or the like of the entrusted calculation apparatus 30, for example.

The communication unit 301 performs various kinds of communication with the device 10. The mutual authentication unit 302 performs mutual authentication with the device 10, using a common key stored in the storage unit 304 in advance, before being entrusted by the device 10 with processing for one or more private keys of the plurality of private keys to be used in authenticated key sharing.

The entrusted calculation unit 303 performs processing for private keys, with which the entrusted calculation unit 303 is entrusted by the device 10. The storage unit 304 stores one or more private keys of the plurality of private key to be used in authenticated key sharing, the shared key to be used in mutual authentication with the device 10, and so on.

<Key Sharing Processing>

The following describes cases in which key sharing processing is performed between the device 10 and the server apparatus 20, as Examples 1 and 2. Example 1 describes a case in which FSU is used as the authenticated key sharing protocol and authenticated key sharing is performed using a plurality of private keys, and the entrusted calculation apparatus 30 is entrusted with processing for one or more private keys of the plurality of private keys. Example 2 describes a case in which Chen-Cheng-Smart is used as the authenticated key sharing protocol and authenticated key sharing is performed using a plurality of private keys, and the entrusted calculation apparatus 30 is entrusted with processing for one or more private keys of the plurality of private keys. Note that Examples 1 and 2 describe examples in which the device 10 serves as a sender in encrypted communication and the server apparatus 20 serves as a receiver in encrypted communication.

Definition of Symbols

The following symbols are used in Examples 1 and 2.

$ID_A$: the identifier of the device 10
$ID_B$: the identifier of the server apparatus 20
k: the security parameter
p, q: prime numbers that satisfy $p \neq q$
$G_1$: a subgroup in an elliptic curve $E_1 := E(F_p)$ over a finite field $F_p$
$G_2$: a subgroup in an elliptic curve $$E_2 := E(F_{p^k})$$ [Formula 1]

over the kth degree extension field of $F_p$
$g_1$: the generator of $G_1$
$g_2$: the generator of $G_2$
$Z_q$: the coset modulo q
$z \in Z_q$: the master private key
$Z_v = zg_v \in G_v$ (v=1, 2): the master public key
$H_1$: A function that generates an element on $G_1$ from a character string (i.e. an octet sequence)
$H_2$: A function that generates an element on $G_2$ from a character string
H: A key derivation function
e: Optimal Ate pairing over a BN (Barret-Naehrig) curve
For Optimal Ate pairing over a BN curve, see Reference 1 below, for example.

Reference 1

K. Kasamatsu, S. Kanno, T. Kobayashi and Y. Kawahara: Optimal Ate Pairing draft-kasamatsu-optimal-ate-pairings-00. Network Working Group Internet-Draft: to appear.

Here, information indicated by the symbols defined above is public information, except for the master private key z.

Example 1

Figure 5:
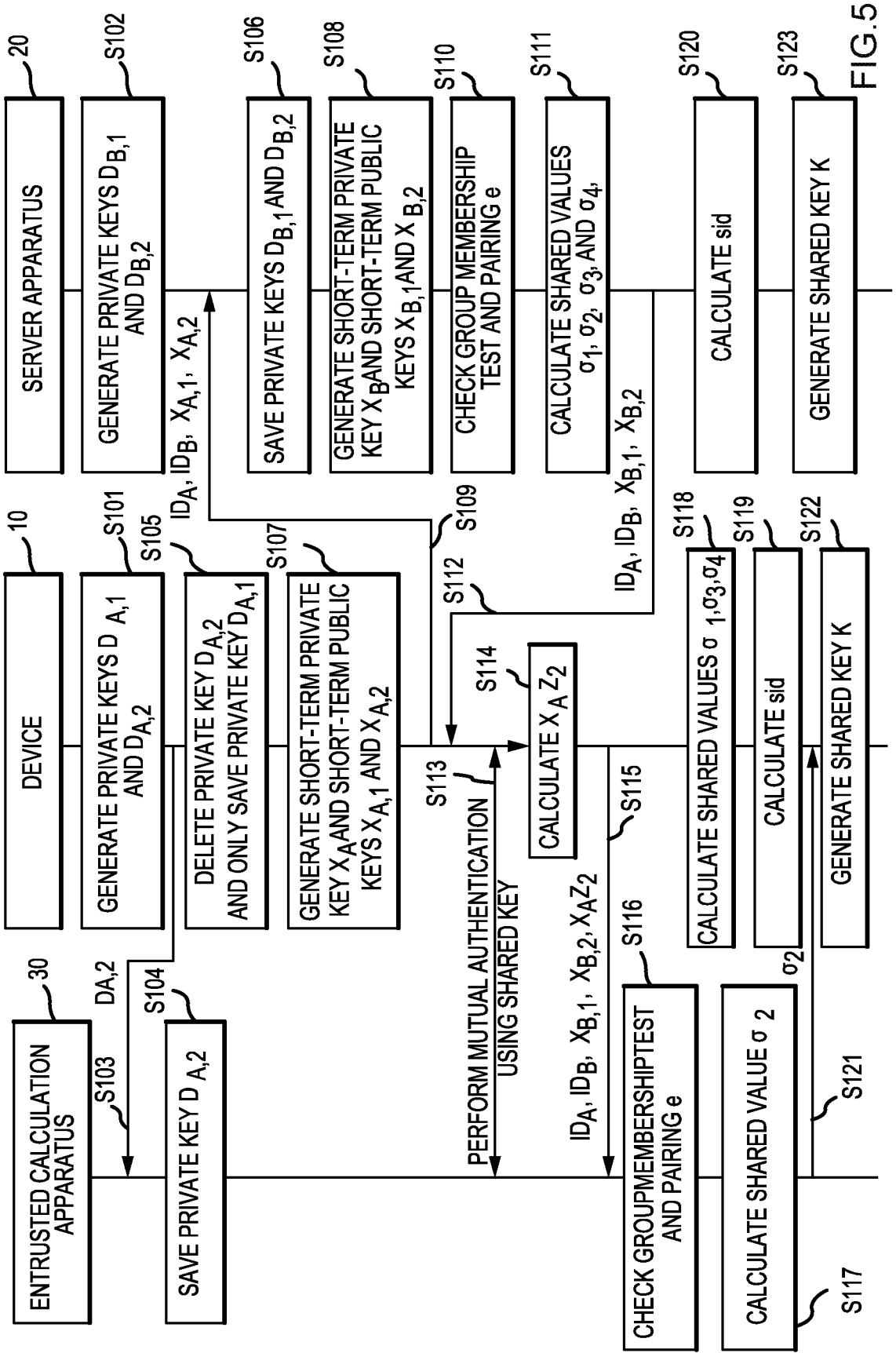
FIG. 5 is a sequence diagram showing an example of key sharing processing according to the embodiment of the present invention (Example 1).

First, a case in which FSU is used as the authenticated key sharing protocol will be described with reference to FIG. 5, as Example 1 of key sharing processing. FIG. 5 is a sequence diagram showing an example of the key sharing processing according to the embodiment of the present invention (Example 1).

The key sharing processing unit 103 of the device 10 generates a private key $D_{A,1} = zH_1(ID_A) \in G_1$ and a private key $D_{A,2} = zQ_{A,2} = zH_2(ID_A) \in G_2$ (step S101). Here, the key sharing processing unit 103 generates the private keys $D_{A,1}$ and $D_{A,2}$ by carrying out the following steps S101-1 and S101-2.

Step S101-1: the key sharing processing unit 103 calculates $Q_{A,1} = H_1(ID_A)$ and $Q_{A,2} = H_2(ID_A)$, and publishes $Q_{A,1}$ and $Q_{A,2}$.

Step S101-2: the key sharing processing unit 103 accesses the key generation center (KGC), and receives private keys $D_{A,1} = zQ_{A,1}$ and $D_{A,2} = zQ_{A,2}$ generated by the key generation center. Thus, the private keys $D_{A,1}$ and $D_{A,2}$ are generated.

The key sharing processing unit 202 of the server apparatus 20 generates a private key $D_{B,1} = zQ_{B,1} = zH_1(ID_B) \in G_1$ and a private key $D_{B,2} = zQ_{B,2} = zH_2(ID_B) \in G_2$ (step S102). Here, the key sharing processing unit 202 generates private keys $D_{B,1}$ and $D_{B,2}$ by carrying out the following steps S102-1 and S102-2.

Step S102-1: the key sharing processing unit 202 calculates $Q_{B,1} = H_1(ID_B)$ and $Q_{B,2} = H_2(ID_B)$ and publishes $Q_{B,1}$ and $Q_{B,2}$.

Step S102-2: the key sharing processing unit 202 accesses the key generation center (KGC) and receives private keys $D_{B,1} = zQ_{B,1}$ and $D_{B,2} = zQ_{B,2}$ generated by the key generation center. Thus, private keys $D_{B,1}$ and $D_{B,2}$ are generated. Note that the server apparatus 20 is a receiver, and therefore the private key $D_{B,1}$ need not necessarily be generated.

The communication unit 101 of the device 10 transmits the private key $D_{A,2}$ to the entrusted calculation apparatus 30 (step S103).

Upon the communication unit 301 receiving the private key $D_{A,2}$, the entrusted calculation unit 303 of the entrusted calculation apparatus 30 saves the private key $D_{A,2}$ in the storage unit 304 (step S104).

The key sharing processing unit 103 of the device 10 deletes the private key $D_{A,2}$, and only saves the private key $D_{A,1}$ in the storage unit 104 (step S105).

The key sharing processing unit 202 of the server apparatus 20 saves the private keys $D_{B,1}$ and $D_{B,2}$ in the storage unit 203 (step S106). Note that the server apparatus 20 is a receiver, and therefore only the private key $D_{B,2}$ may be saved in the storage unit 203 and the private key $D_{B,1}$ may be deleted.

The key sharing processing unit 103 of the device 10 randomly selects a short-term private key $x_A \in Z_q$, and calculates a short-term public key $X_{A,1} = x_A g_1$ and a short-term public key $X_{A,2} = x_A g_2$ (step S107). Thus, the short-term private key $x_A$ and the short-term public keys $X_{A,1}$ and $X_{A,1}$ are generated. Note that the short-term private key $x_A$ and the short-term public keys $X_{A,1}$ and $X_{A,1}$ are stored in the storage unit 104, for example.

The key sharing processing unit 202 of the server apparatus 20 randomly selects a short-term private key $x_B \in Z_q$, and calculates a short-term public key $X_{B,1} = x_B g_1$ and a short-term public key $X_{B,2} = x_B g_2$ (step S108). Thus, the short-term private key $x_B$ and the short-term public keys $X_{B,1}$ and $X_{B,2}$ are generated. Note that the short-term private key $x_B$ and the short-term public keys $X_{B,1}$ and $X_{B,2}$ are stored in the storage unit 203, for example.

The communication unit 101 of the device 10 transmits the identifier $ID_A$, the identifier $ID_B$, the short-term public key $X_{A,1}$, and the short-term public key $X_{A,2}$ to the server apparatus 20 (step S109).

The key sharing processing unit 202 of the server apparatus 20 checks whether or not a GROUPMEMBERSHIPTEST function value for the elliptic curve $E_1$ and $X_{A,2}$ and a GROUPMEMBERSHIPTEST function value for an elliptic curve $E_2$ and $X_{A,1}$ are both 1 and $e(X_{A,1}, g_2) = e(g_1, X_{A,2})$ is satisfied (step S110). Here, a GROUPMEMBERSHIPTEST function is a function in which an elliptic curve E and a point P are specified as parameters, and is equal to 1 when the point P is on the elliptic curve E, and otherwise is equal to 0.

Note that, in the above step S110, if a GROUPMEMBERSHIPTEST function value is 0 or $e(X_{A,1}, g_2) \ne e(g_1, X_{A,2})$ is satisfied, it is determined that key sharing processing has failed, and processing is terminated or is started again from step S101. The following describes a case in which it has been confirmed that both GROUPMEMBERSHIPTEST function values are 1 and $e(X_{A,1}, g_2) = e(g_1, X_{A,2})$ is satisfied in the above step S110.

The key sharing processing unit 202 of the server apparatus 20 calculates shared values $\sigma_1$, $\sigma_2$, $\sigma_3$, and $\sigma_4$ in the following manner (step S111).

$$\sigma_1 = e(Q_{A,1}, D_{B,2})$$

$$\sigma_2 = e(Q_{A,1} + X_{A,1}, D_{B,2} + x_B Z_2)$$

$$\sigma_3 = x_B X_{A,1}$$

$$\sigma_4 = x_B X_{A,2}$$

Next, the communication unit 201 of the server apparatus 20 transmits the identifier $ID_A$, the identifier $ID_B$, the short-term public key $X_{B,1}$, and the short-term public key $X_{B,2}$ to the device 10 (step S112).

The mutual authentication unit 102 of the device 10 and the mutual authentication unit 302 of the entrusted calculation apparatus 30 perform mutual authentication using the shared key (step S113). That is to say, the mutual authentication unit 102 of the device 10 authenticates the entrusted calculation apparatus 30, using the common key stored in the storage unit 104 in advance, and the mutual authentication unit 302 of the entrusted calculation apparatus 30 authenticates the device 10, using the common key stored in the storage unit 304 in advance. Thus, the validity of the device 10 and the entrusted calculation apparatus 30 is confirmed by each other. Thus, by using the common key, it is possible to reduce the processing time required for mutual authentication between the device 10 and the entrusted calculation apparatus 30.

The following describes a case in which the mutual authentication in step S113 is successful. If mutual authentication is successful, the device 10 and the entrusted calculation apparatus 30 generate a session key, and the subsequent communication will be encrypted using this session key. Therefore, it is assumed that the communication in the following steps S115 and S121 is encrypted using this session key.

The key sharing processing unit 103 of the device 10 calculates $x_A Z_2$ (step S114). Next, the communication unit 101 of the device 10 transmits the identifier $ID_A$, the identifier $ID_B$, the short-term public key $X_{B,1}$, the short-term public key $X_{B,2}$, and the calculated value $x_A Z_2$ to the entrusted calculation apparatus 30 (step S115).

The entrusted calculation unit 303 of the entrusted calculation apparatus 30 checks whether or not a GROUPMEMBERSHIPTEST function value for the elliptic curve $E_1$ and $X_{B,2}$ and a GROUPMEMBERSHIPTEST function value for the elliptic curve $E_2$ and $X_{B,1}$ are both 1 and $e(X_{B,1}, g_2) = e(g_1, X_{B,2})$ is satisfied (step S116).

Note that, in the above step S116, if a GROUPMEMBERSHIPTEST function value is 0 or $e(X_{B,1}, g_2) \ne e(g_1, X_{B,2})$ is satisfied, it is determined that key sharing processing has failed, and processing is terminated or is started again from step S101. The following describes a case in which it has been confirmed that both GROUPMEMBERSHIPTEST function values are 1 and $e(X_{B,1}, g_2) = e(g_1, X_{B,2})$ is satisfied in the above step S116.

Next, the entrusted calculation unit 303 of the entrusted calculation apparatus 30 calculates the shared value $\sigma_2$ in the following manner (step S117).

$$\sigma_2 = e(Q_{B,1} + X_{B,1}, D_{A,2} + x_A Z_2)$$

In this way, the entrusted calculation apparatus 30 calculates $e(Q_{B,1} + X_{B,1}, D_{A,2} + x_A Z_2)$ as $\sigma_2$. That is to say, according to the conventional FSU, $\sigma_2 = e(D_{A,1} + x_A Z_1, Q_{B,2} + X_{B,2})$ is calculated (see NPL 1), whereas, in Example 1, the inputs to the pairing e are reversed and $e(Q_{B,1} + X_{B,1}, D_{A,2} + x_A Z_2)$ is calculated. Thus, it is possible to calculate $\sigma_2$ using the private key $D_{A,2}$.

On the other hand, the key sharing processing unit 103 of the device 10 calculates the shared values $\sigma_1$, $\sigma_3$, and $\sigma_4$ in the following manner (step S118).

$$\sigma_1 = e(Q_{A,1}, D_{B,2})$$

$$\sigma_3 = x_A X_{B,1}$$

$$\sigma_4 = x_A X_{B,2}$$

Next, the key sharing processing unit 103 of the device 10 calculates sid in the following manner (step S119). Note that sid denotes a session ID.

$$sid = (ID_A \| ID_B \| \hat{X}_{A,1} \| \hat{X}_{A,2} \| \hat{X}_{B,1} \| \hat{X}_{B,2}) \quad \text{[Formula 2]}$$

where
$\hat{X}_{A,1}$ denotes a character string converted from $X_{A,1}$,
$\hat{X}_{A,2}$ denotes a character string converted from $X_{A,2}$,
$\hat{X}_{B,1}$ denotes a character string converted from $X_{B,1}$,
$\hat{X}_{B,2}$ denotes a character string converted from $X_{B,2}$ and
$\|$ denotes concatenation of character string.

The key sharing processing unit 202 of the server apparatus 20 calculates sid in the following manner (step S120).

$$sid = (ID_A \| ID_B \| \hat{X}_{A,1} \| \hat{X}_{A,2} \| \hat{X}_{B,1} \mu \hat{X}_{B,2}) \quad \text{[Formula 3]}$$

The communication unit 301 of the entrusted calculation apparatus 30 transmits the shared value $\sigma_2$ to the device 10 (step S121).

Upon the communication unit 101 receiving the shared value $\sigma_2$, the key sharing processing unit 103 of the device 10 generates a shared key K in the following manner (step S122).

$$K = H(\sigma_1 \| \sigma_2 \| \sigma_3 \| \sigma_4 \| sid) \quad \text{[Formula 4]}$$

Note that the shared key K is stored in the storage unit 104, for example.

The key sharing processing unit 202 of the server apparatus 20 generates the shared key K in the following manner (step S123).

$$K = H(\sigma_1 \| \sigma_2 \| \sigma_3 \| \sigma_4 \| sid) \quad \text{[Formula 5]}$$

Note that the shared key K is stored in the storage unit 203, for example.

Thus, the shared key K is shared between the device 10 and the server apparatus 20. Therefore, hereafter, the device and the server apparatus 20 can perform encrypted communication using the shared key K.

As described above, in the key sharing processing in Example 1, the device 10 generates two private keys $D_{A,1}$ and $D_{A,2}$ using two different groups $G_1$ and $G_2$, saves the private key $D_{A,1}$ in the device 10, and saves the private key $D_{A,2}$ in the entrusted calculation apparatus 30. The device 10 performs pairing computation ($\sigma_1$) using the private key $D_{A,1}$, and the entrusted calculation apparatus 30 performs pairing computation ($\sigma_2$) using the private key $D_{A,2}$.

In this way, in the key sharing processing in Example 1, the shared key K is generated using the plurality of private keys $D_{A,1}$ and $D_{A,2}$. As a result, for example, even if the private key $D_{A,1}$ leaks out from the device 10 to a third party, the third party cannot perform spoofing or the like unless the private key $D_{A,2}$ saved in the entrusted calculation apparatus 30 leaks out. Therefore, for example, even if the device 10 is an IoT device that is provided outdoors and may be lost or stolen, it is possible to prevent a third party from performing spoofing or the like by steeling the device 10 or leaking the private key $D_{A,1}$.

Also, in the key sharing processing in Example 1, the entrusted calculation apparatus 30 is entrusted with pairing computation performed to obtain $\sigma_2$. As a result, even if the device 10 an IoT device that has relatively low processing capabilities, processing time can be reduced. In particular, even if the private key $D_{A,1}$ is stored in the tamper-resistant area of the device 10, processing time is reduced, and key sharing processing can be performed within a feasible processing time.

Example 2

Figure 6:
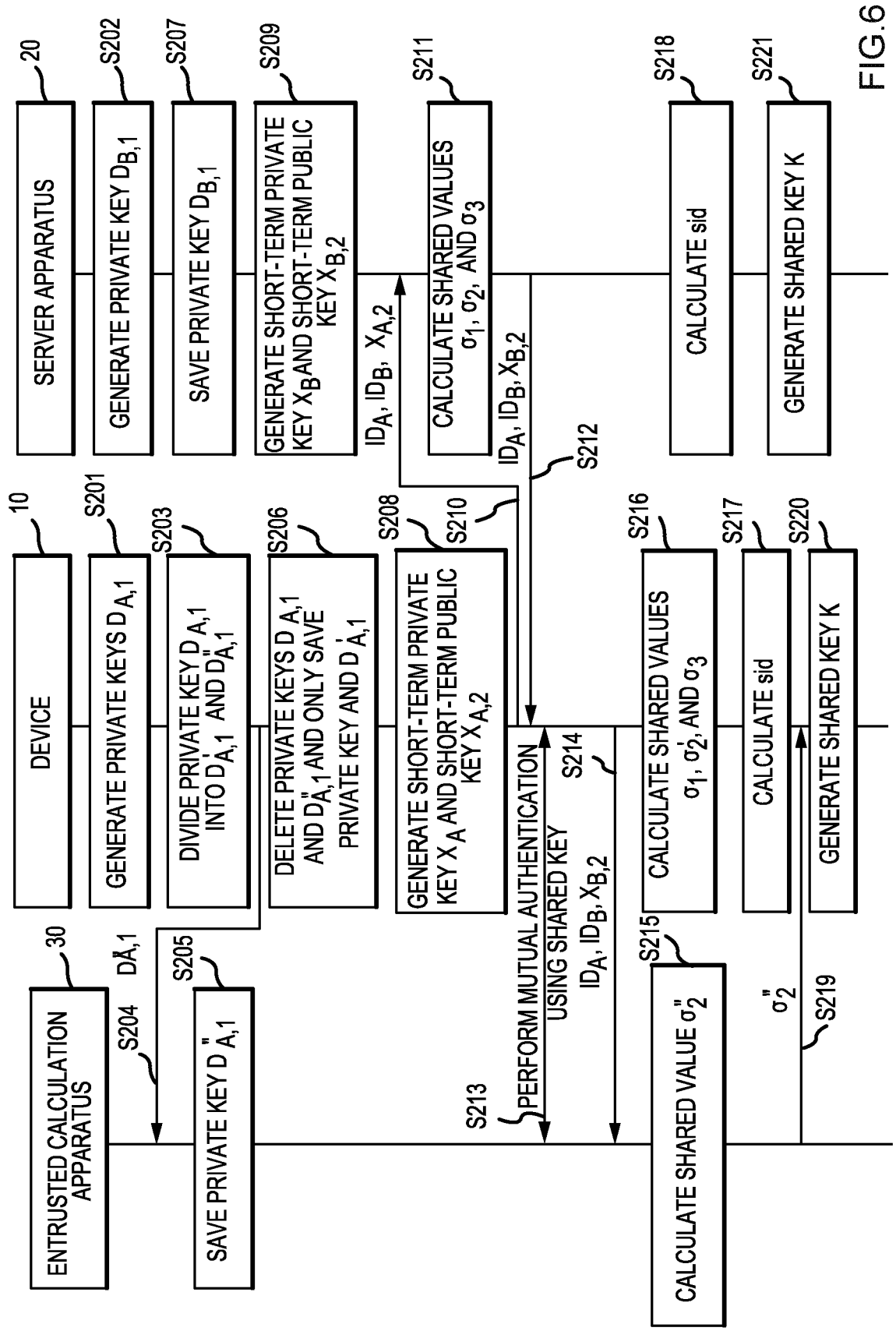
FIG. 6 is a sequence diagram showing an example of key sharing processing according to the embodiment of the present invention (Example 2).

Next, a case in which Chen-Cheng-Smart is used as the authenticated key sharing protocol will be described with reference to FIG. 5, as Example 2 of key sharing processing. FIG. 6 is a sequence diagram showing an example of the key sharing processing according to the embodiment of the present invention (Example 2).

The key sharing processing unit 103 of the device 10 generates a private key $D_{A,1}=zQ_{A,1}=zH_1(ID_A) \in G_1$ (step S201). Here, the key sharing processing unit 103 generates the private key $D_{A,1}$ by carrying out the following steps S201-1 and S201-2.

Step S201-1: the key sharing processing unit 103 calculates $Q_{A,1}=H_1(ID_A)$, and publishes $Q_{A,1}$.

Step S201-2: the key sharing processing unit 103 accesses the key generation center (KGC), and receives private key $D_{A,1}=zQ_{A,1}$ generated by the key generation center. Thus, the private key $D_{A,1}$ is generated.

The key sharing processing unit 202 of the server apparatus 20 generates a private key $D_{B,1}=zQ_{B,1}=zH_1(TD_B) \in G_1$ (step S202). Here, the key sharing processing unit 202 generates private key $D_{B,1}$ by carrying out the following steps S202-1 and S202-2.

Step S202-1: the key sharing processing unit 202 calculates $Q_{B,1}=H_1(ID_B)$, and publishes $Q_{B,1}$.

Step S202-2: the key sharing processing unit 202 accesses the key generation center (KGC) and receives a private key $D_{B,1}=zQ_{B,1}$ generated by the key generation center. Thus, the private key $D_{B,1}$ is generated.

The key sharing processing unit 103 of the device 10 randomly selects $z_1 \in Z_q$, and divides the private key $D_{A,1}$ into private keys $D'_{A,1}$ and $D''_{A,1}$ in the following manner (step S203).

$$D'_{A,1}=z_1 Q_{A,1}$$

$$D''_{A,1}=D_{A,1}-D_{A,1}$$

Next, the communication unit 101 of the device 10 transmits the private key $D''_{A,1}$ to the entrusted calculation apparatus 30 (step S204).

Upon the communication unit 301 receiving the private key $D''_{A,2}$, the entrusted calculation unit 303 of the entrusted calculation apparatus 30 saves the private key $D''_{A,2}$ in the storage unit 304 (step S205).

The key sharing processing unit 103 of the device 10 deletes the private keys $D_{A,1}$ and $D''_{A,1}$, and only saves the private key $D'_{A,1}$ in the storage unit 104 (step S206).

The key sharing processing unit 202 of the server apparatus 20 saves the private key $D_{B,1}$ in the storage unit 203 (step S207).

The key sharing processing unit 103 of the device 10 randomly selects a short-term private key $X_A \in Z_q$, and calculates a short-term public key $X_{A,2}=x_A g_2$ (step S208). Thus, the short-term private key $x_A$ and the short-term public key $X_{A,2}$ are generated. Note that the short-term private key $x_A$ and the short-term public key $X_{A,2}$ are stored in the storage unit 104, for example.

The key sharing processing unit 202 of the server apparatus 20 randomly selects a short-term private key $x_B \in Z_q$, and calculates a short-term public key $X_{B,2}=x_B g_2$ (step S209). Thus, the short-term private key $x_B$ and the short-term public key $X_{B,2}$ are generated. Note that the short-term private key $x_B$ and the short-term public key $X_{B,2}$ are stored in the storage unit 203, for example.

The communication unit 101 of the device 10 transmits the identifier $ID_A$, the identifier $ID_B$, and the short-term public key $X_{A,2}$, to the server apparatus 20 (step S210).

The key sharing processing unit 202 of the server apparatus 20 calculates shared values $\sigma_1$, $\sigma_2$, and $\sigma_3$ in the following manner (step S211).

$$\sigma_1=e(x_B Q_{A,1},Z_2)$$

$$\sigma_2=e(D_{B,1},X_{A,2})$$

$$\sigma_3=x_B X_{A,2}$$

Next, the communication unit 201 of the server apparatus 20 transmits the identifier $ID_A$, the identifier $ID_B$, and the short-term public key $X_{B,2}$ to the device 10 (step S212).

The mutual authentication unit 102 of the device 10 and the mutual authentication unit 302 of the entrusted calculation apparatus 30 perform mutual authentication using the shared key as in Example 1 (step S213). That is to say, the mutual authentication unit 102 of the device 10 authenticates the entrusted calculation apparatus 30, using the common key stored in the storage unit 104 in advance, and the mutual authentication unit 302 of the entrusted calculation apparatus 30 authenticates the device 10, using the common key stored in the storage unit 304 in advance.

The following describes a case in which the mutual authentication in step S213 is successful. If mutual authentication is successful, the device 10 and the entrusted calculation apparatus 30 generate a session key, and the subsequent communication will be encrypted using this session key. Therefore, it is assumed that the communication in the following steps S214 and S219 is encrypted using this session key.

Next, the communication unit 101 of the device 10 transmits the identifier $ID_A$, the identifier $ID_B$, and the short-term public key $X_{B,2}$ to the entrusted calculation apparatus 30 (step S214).

Next, the entrusted calculation unit 303 of the entrusted calculation apparatus 30 calculates a shared value $\sigma''_2$, in the following manner (step S215).

$$\sigma''_2 = e(D''_{A,1}, X_{B,2})$$

In this way, the entrusted calculation apparatus 30 calculates $e(D''_{A,1}, X_{B,2})$ as $\sigma''_2$. That is to say, according to conventional Chen-Cheng-Smart, $\sigma_2 = (D_{A,1}, X_{B,2})$ is calculated, whereas, in Example 2, $D''_{A,1}$ is used instead of $D_{A,1}$, and $\sigma''_2 = e(D''_{A,1}, X_{B,2})$ is calculated. For conventional Chen-Cheng-Smart, see Reference 2 below, for example.

Reference 2

L. Chen, Z. Cheng, N. Smart: Identity-based key agreement protocols from pairings. International Journal of Information Security, July 2007, Volume 6, issue 4, pp 213-241.

On the other hand, the key sharing processing unit 103 of the device 10 calculates the shared values $\sigma_1$, $\sigma'_2$, and $\sigma_3$ in the following manner (step S216).

$$\sigma_1 = e(x_A Q_{B,1}, Z_2)$$

$$\sigma'_2 = e(D'_{A,1}, X_{B,2})$$

$$\sigma_3 = x_A X_{B,2}$$

Next, the key sharing processing unit 103 of the device 10 calculates sid in the following manner (step S217).

$$\text{sid} = (ID_A \| ID_B \| ID_B \| \hat{X}_{A,2} \| \hat{X}_{B,2}) \quad [\text{Formula 6}]$$

The key sharing processing unit 202 of the server apparatus 20 calculates sid in the following manner (step S218).

$$\text{sid} = (ID_A \| ID_B \| \hat{X}_{A,2} \| \hat{X}_{B,2}) \quad [\text{Formula 7}]$$

The communication unit 301 of the entrusted calculation apparatus 30 transmits the shared value $\sigma''_2$ to the device 10 (step S219).

Upon the communication unit 101 receiving the shared value $\sigma''_2$, the key sharing processing unit 103 of the device 10 generates a shared key K in the following manner (step S220).

$$K = H(\sigma_1 \cdot \sigma'_2 \cdot \sigma''_3 \| \sigma_3 \sigma \text{sid}) \quad [\text{Formula 8}]$$

Note that the shared key K is stored in the storage unit 104, for example.

The key sharing processing unit 202 of the server apparatus 20 generates the shared key K in the following manner (step S221).

$$K = H(\sigma_1 \cdot \sigma_2 \| \sigma_3 \| \text{sid}) \quad [\text{Formula 9}]$$

Note that the shared key K is stored in the storage unit 203, for example.

Thus, the shared key K is shared between the device 10 and the server apparatus 20. Therefore, hereafter, the device and the server apparatus 20 can perform encrypted communication using the shared key K.

As described above, in the key sharing processing in Example 2, the device 10 generates one private key $D_{A,1}$, divides the private key $D_{A,1}$ into two private keys $D'_{A,1}$ and $D''_{A,1}$, saves the private key $D'_{A,1}$ in the device 10, and saves the private key $D''_{A,1}$ in the entrusted calculation apparatus 30. The device 10 performs pairing computation ($\sigma'_2$) using the private key $D'_{A,1}$, and the entrusted calculation apparatus 30 performs pairing computation ($\sigma''_2$) using the private key $D''_{A,1}$.

In this way, in the key sharing processing in Example 2, the shared key K is generated using the plurality of private keys $D'_{A,1}$ and $D''_{A,1}$ divided from one private key $D_{A,1}$. As a result, as in Example 1, for example, even if the private key $D'_{A,1}$ leaks out from the device 10 to a third party, the third party cannot perform spoofing or the like unless the private key $D''_{A,1}$ saved in the entrusted calculation apparatus 30 leaks out.

In Example 2, the device 10 needs to perform pairing computation twice ($\sigma_1$ and $\sigma'_2$), and therefore it is not possible to achieve the effect of reducing processing time when compared to Example 1, but it is possible to achieve the same degree of safety as in Example 1, as described above. Also, in Example 2, it is possible to achieve the same degree of safety as in Example 1 without changing the algorithm of the authenticated key sharing protocol according to Chen-Cheng-Smart.

Note that, in Example 2, the private key $D_{A,1}$ is divided by utilizing the fact that $\sigma'_2 \sigma''_2 = \sigma_2 = e(D_{A,1}, X_{B,2})$ is satisfied due to the properties of the pairing calculation $e((x_1+x_2)P, Q) = e(x_1, P) e(x_2, P)$.

Summary

As described above, in the key sharing system 1 according to the embodiment of the present invention, the device 10 generates a plurality of private keys, and one or more of the private keys are saved in the device 10 and the other one or more private keys are saved in the entrusted calculation apparatus 30. Also, in the key sharing system 1 according to the embodiment of the present invention, the device 10 calculates shared values using the one or more private keys, and entrusts the entrusted calculation apparatus 30 with calculation of shared values using the other one or more private keys. As a result, the key sharing system 1 according to the embodiment of the present invention can perform highly secure authenticated key sharing. Also, at this time, the entrusted calculation apparatus 30 calculates share values (pairing computation), and therefore, it is possible to prevent degradation in terms of processing time of authenticated key sharing even if the device is an IoT device that has relatively low processing capabilities.

Here, in the embodiment of the present invention, generally, in a case of an authenticated key sharing protocol according to which a shared key K is generated using n shared values $\sigma_i$ (I=1, ..., n), if $\sigma_j$ and $\sigma_k$ are calculated for j and k (j≠k) through pairing computation, and a private key $D_{A,1}$ or $D_{A,2}$ is used as an input to such pairing computation, the entrusted calculation apparatus 30 can be trusted with calculation of one or more of the shared values (pairing computation). That is to say, in a case where $\sigma_j$ and $\sigma_k$ are expressed as $$\sigma_j = e\left(\sum_{l1=1} a_{l1} g_1 + D_{A,1}, \sum_{m1=1} b_{m1} g_2\right) \quad [\text{Formula 10}]$$

$$\sigma_k = e\left(\sum_{l2=1} a_{l2} g_1 + D_{A,1}, \sum_{m2=1} b_{m2} g_2\right)$$

where $a_{l1}, a_{l2}, b_{m1}, b_{m2} \in Z_q$ are given integers, $b_{m2} g_1, a_{l2} g_2$, and $D_{A,1}$ are generated, and inputs to $\sigma_k$ are provided as follows.

$$\sigma_k = e\left(\sum_{m2=1} b_{m2}g_1 + D_{A,1}, \sum_{l2=1} a_{l2}g_2 + D_{A,2}\right) \quad \text{[Formula 11]}$$

Thus, it is possible to entrust the entrusted calculation apparatus 30 with calculation of this $\sigma_k$.

Note that, in a case of an authenticated key sharing protocol that uses pairing computation in which only a public key is input instead of a private key, it is possible to entrust the entrusted calculation apparatus 30 with such pairing computation as well.

Also, in a case where FSU is used as an authenticated key sharing protocol, it is possible that the device 10 calculates $\sigma_2'=e(D_{A,1}+x_A Z_1, Q_{B,2}+X_{B,2})$ as with the case of the conventional the entrusted calculation apparatus 30 is caused to calculate $\sigma_2''=e(Q_{B,1}+X_{B,1}, D_{A,2}+x_A Z_2)$, and these are concatenated by $\sigma_2=\sigma_2'\|\sigma_2''$. Also, at this time, the device 10 may calculate $$K=H(\sigma_1\|\sigma_2'\|\sigma_3\|\sigma_4\|\text{sid}) \quad \text{[Formula 12]}$$

and transmit $$t=\text{MAC}(K,\sigma_1\|\sigma_2\|\sigma_3\|\sigma_4\|\text{sid}) \quad \text{[Formula 13]}$$

to the server apparatus 20. As a result, the server apparatus 20 also calculates a similar MAC (Message Authentication Code), the device 10 receives this result of calculation, and thus the device 10 can verify whether or not the result of calculation with which the entrusted calculation apparatus 30 was entrusted is correct, even though the number of times the device 10 calculates shared values (pairing computation) increases by one. Such an operation is particularly effective in a case where the entrusted calculation apparatus 30 is entrusted with calculation of a shared value (pairing computation) even though mutual authentication between the device 10 and the entrusted calculation apparatus 30 is not successful.

Note that Example 1 describes the key sharing processing in a case where the device 10 is the sender and the server apparatus 20 is the receiver on the premise that the private key $D_{A,1}$ is to be saved in the storage unit 104 of the device 10 and the private key $D_{A,2}$ is to be saved in the storage unit 304 of the entrusted calculation apparatus 30. If the device 10 is the receiver and the server apparatus 20 is the sender on the same presumption, the device 10 may entrust the entrusted calculation apparatus 30 with the calculation of the shared value $\sigma_1$, and calculate the shared value $\sigma_2$ by itself, with the formulas for calculating the shared values $\sigma_1$ and $\sigma_2$ being changed to $\sigma_1=(Q_{B,1}, D_{A,2})$ and $\sigma_2=(D_{A,1}+x_A Z_1, Q_{B,2}+X_{B,2})$. At this time, the device 10 may transmit $\text{ID}_B$, $X_{B,1}$, and $X_{B,2}$ to the entrusted calculation apparatus 30 when entrusting the entrusted calculation apparatus 30 with the calculation of the shared value $\sigma_1$.

However, when the device 10 is the receiver and the server apparatus 20 is the sender, it is possible to realize the key sharing processing without changing the shared value, the calculation of which is entrusted to the entrusted calculation apparatus 30, or the formulas for calculating the shared values. If this is the case, in the key sharing processing in Example 1, the device 10 and the server apparatus 20 exchange the short-term public keys ($X_{A,1}$, $X_{A,2}$, $X_{B,1}$, and $X_{B,2}$) with each other.

Note that, in the key sharing processing in Example 2, even if the roles of the device 10 and the server apparatus 20, i.e. the sender and the receiver, are interchanged with each other, the same processing is to be performed.

Also, although Example 1 and Example 2 describe key sharing processing in which a shared key is shared between the device 10 and the server apparatus 20, a shared key may be shared between the device 10 and another device 10, for example. If this is the case, both the device 10 and the other device 10 may entrust the entrusted calculation apparatus 30 with calculation of one or more of the shared values.

The present invention is not limited to the embodiment specifically disclosed above, and may be variously modified or changed without departing from the scope of claims.

Reference Signs List

1 Key sharing system
10 Device
20 Server apparatus
30 Entrusted calculation apparatus
101 Communication unit
102 Mutual authentication unit
103 Key sharing processing unit
104 Storage unit
201 Communication unit
202 Key sharing processing unit
203 Storage unit
301 Communication unit
302 Mutual authentication unit
303 Entrusted calculation unit
304 Storage unit

The invention claimed is:

1. A computer-implemented method for sharing keys for data security, the method comprising:
   retrieving a first secret key and a second secret key, wherein the first secret key and the second secret key are distinct;
   determining, based on a pairing computation, a first shared value using the first secret key as a first input;
   transmitting an instruction causing a delegation server to generate, based on the pairing computation, a second shared value using the second secret key as a second input, wherein the second shared value is distinct from the first shared value;
   receiving the second shared value during a first authenticated key sharing session;
   generating, based on the first shared value and the second shared value, a shared key for an encrypted data communication during a second authenticated key sharing session according to an authentication key sharing protocol, wherein the second authenticated key sharing session is distinct from the first authenticated key sharing session; and
   causing, using the shared key, the encrypted data communication over a network according to the second authenticated key sharing session.

2. The computer-implemented method of claim 1, wherein the generated shared key is associated with performing an encrypted data communication over a network according to the authentication key sharing protocol.

3. The computer-implemented method of claim 2, wherein the first shared value is based at least on a first part of a first elliptic curve and the second shared value is based at least on a second part of a second elliptic curve.

4. The computer-implemented method of claim 2, wherein the first shared key and the second shared key are distinct parts of a third secret key.

5. The computer-implemented method of claim 2, wherein the authentication key sharing protocol include either a Fujioka-Suzuki-Ustaoglu (FSU) protocol or a Chen-Cheng-Smart protocol.

6. The computer-implemented method of claim 2, the method further comprising:
receiving the second shared value from the delegation server, wherein the delegation server is higher in processing capabilities than a predetermined threshold; and
generating, based on a combination of the first shared value and the second shared value, the shared key for an encrypted data communication over a network.

7. The computer-implemented method of claim 2, the method further comprising:
storing the first secret key in a tamper-resistant memory.

8. A system for sharing keys for data security, the system comprises:
a processor; and
a memory storing computer-executable instructions that when executed by the processor cause the system to:
retrieve a first secret key and a second secret key, wherein the first secret key and the second secret key are distinct;
determine, based on a pairing computation, a first shared value using the first secret key as a first input;
transmit, based on the second secret key, an instruction causing a delegation server to generate, based on the pairing computation, a second shared value, wherein the second shared value is distinct from the first shared value;
receive the second shared value during a first authenticated key sharing session;
generate, based on the first shared value and the second shared value, a shared key for an encrypted data communication during a second authentication key sharing session according to an authentication key sharing protocol, wherein the second authentication key sharing session is distinct from the first authenticated key sharing session; and
causing, using the shared key, the encrypted data communication over a network according to the second authenticated key sharing session.

9. The system of claim 8, wherein the generated shared key is associated with performing an encrypted data communication over a network according to the authentication key sharing protocol.

10. The system of claim 9, wherein the first shared value is based at least on a first part of a first elliptic curve and the second shared value is based at least on a second part of a second elliptic curve.

11. The system of claim 9, wherein the first shared key and the second shared key are distinct parts of a third secret key.

12. The system of claim 9, wherein the authentication key sharing protocol include either a Fujioka-Suzuki-Ustaoglu (FSU) protocol or a Chen-Cheng-Smart protocol.

13. The system of claim 9, the computer-executable instructions when executed further causing the system to:
receive the second shared value from the delegation server, wherein the delegation server is higher in processing capabilities than a predetermined threshold; and
generate, based on a combination of the first shared value and the second shared value, the shared key for an encrypted data communication over a network.

14. The system of claim 9, the computer-executable instructions when executed further causing the system to:
storing the first secret key in a tamper-resistant memory.

15. A computer-readable non-transitory recording medium storing computer-executable instructions that when executed by a processor cause a computer system to:
retrieve a first secret key and a second secret key, wherein the first secret key and the second secret key are distinct;
determine, based on a pairing computation, a first shared value using the first secret key as a first input;
transmit, based on the second secret key, an instruction causing a delegation server to generate, based on the pairing computation, a second shared value, wherein the second shared value is distinct from the first shared value;
receive the second shared value during a first authenticated key sharing session;
generate, based on the first shared value and the second shared value, a shared key for an encrypted data communication during a second authenticated key sharing session according to an authentication key sharing protocol, wherein the second authenticated key sharing session is distinct from the first authenticated key sharing session; and
causing, using the shared key, the encrypted data communication over a network according to the second authenticated key session.

16. The computer-readable non-transitory recording medium of claim 15, wherein the generated shared key is associated with performing an encrypted data communication over a network according to the authentication key sharing protocol.

17. The computer-readable non-transitory recording medium of claim 16, wherein the authentication key sharing protocol include either a Fujioka-Suzuki-Ustaoglu (FSU) protocol or a Chen-Cheng-Smart protocol.

18. The computer-readable non-transitory recording medium of claim 16, wherein the first shared value is based at least on a first part of a first elliptic curve and the second shared value is based at least on a second part of a second elliptic curve.

19. The computer-readable non-transitory recording medium of claim 16, wherein the first shared key and the second shared key are distinct parts of a third secret key.

20. The computer-readable non-transitory recording medium of claim 16, the computer-executable instructions when executed further causing the system to:
receive the second shared value from the delegation server, wherein the delegation server is higher in processing capabilities than a predetermined threshold; and
generate, based on a combination of the first shared value and the second shared value, the shared key for an encrypted data communication over a network.

* * * * *